BRAKE MECHANISM
Filed Oct. 4, 1943
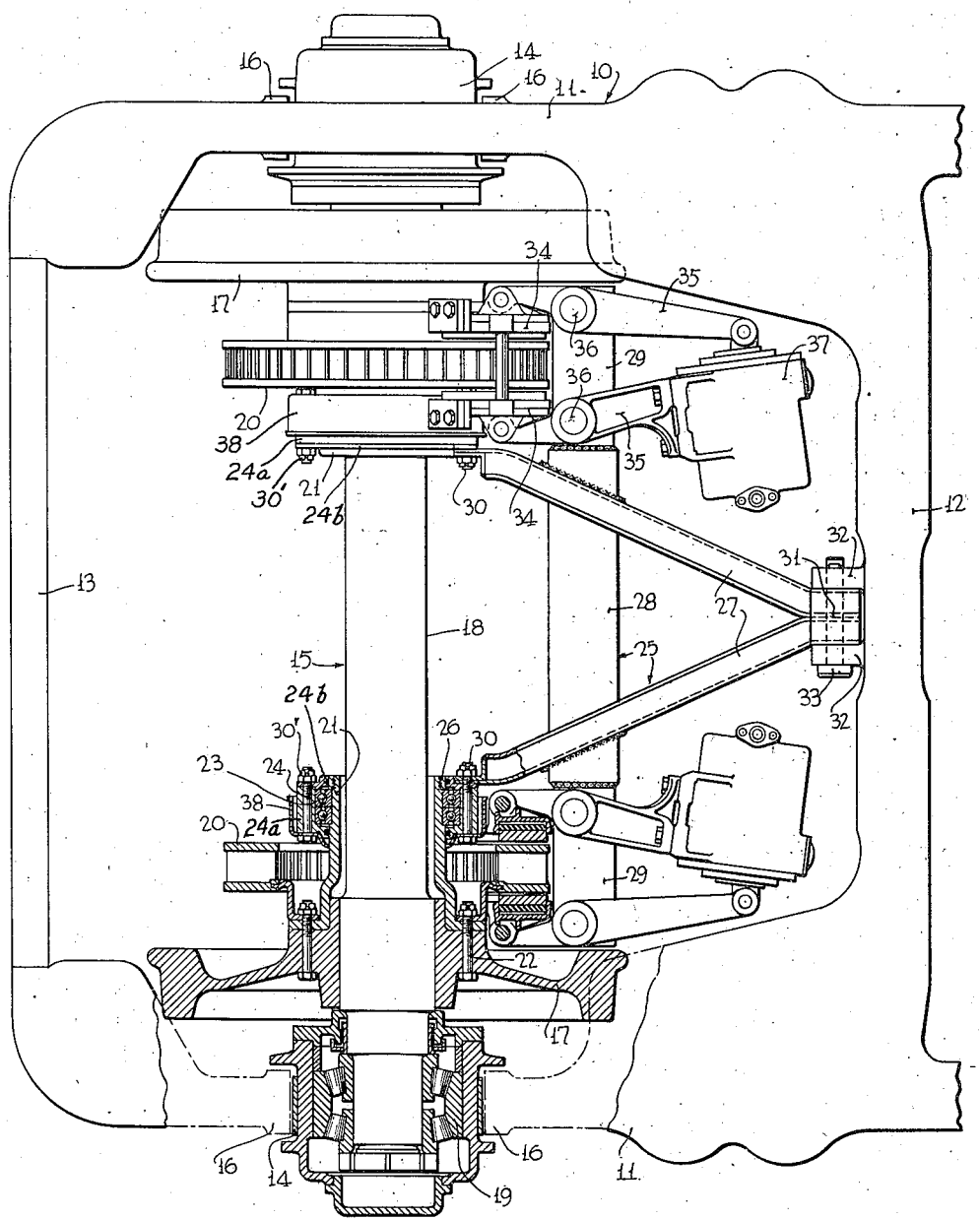
INVENTOR
Carolus L. Eksergian
BY John P. Barbop
ATTORNEY Patented Feb. 4, 1947

2,415,345

UNITED STATES PATENT OFFICE 2,415,345

BRAKE MECHANISM

Carolus L. Eksergian, Detroit, Mich., assignor to The Budd Company, Philadelphia, Pa., a corporation of Pennsylvania Application October 4, 1943, Serial No. 504,857

2 Claims. (Cl. 188—59)

The invention relates to a brake mechanism, and particularly to such a mechanism adapted for use in a railway truck.

It is an object of the invention to simplify the mounting of the brake mechanism, particularly in trucks in which at least one of the wheels rotates with the axle of the wheel and axle assembly with which it is associated. In such trucks, since the axle is rotating, if the brake support is mounted directly on the axle, elaborate bearings have to be provided on the axle. This necessitates press fitting bearing seats on the axle, and is liable to set up undesirable internal stresses in the axle.

To avoid this, according to the invention the bearing seats for the brake support are directly mounted on the wheels carried by the axle and spaced from the axle. Bearing rings are readily associated with such seats, and a very simple form of brake support may be demountably associated with these rings.

According to a preferred form of the invention the bearing seats are provided on sleeves secured to the wheel hubs and extending axially inwardly thereof and the rotary brake members associated with the wheels may be secured, together with the bearing seat sleeves, by common securing means to the respective wheels. Other and further objects and advantages and the manner in which they are attained will become apparent from the following detailed description when read in connection with the appended drawing forming a part of this specification.

In the drawing, the figure is a plan view of one end of a railway truck showing the invention applied thereto, parts being broken away and shown in section in the horizontal plane of the axle.

The truck may comprise a frame 10 having side frame members 11 interconnected by transoms, as 12, and end frame members, as 13. The frame is supported in a usual manner through springs (not shown) from equalizer bars (not shown) in turn supported from the journal boxes, as 14 of the wheel and axle assembly, designated generally by numeral 15.

The frame 10 is guided for relative vertical movement with respect to the wheel and axle assembly 15 by the usual pedestals, as 16 slidably engaging the opposite sides of the respective journal boxes.

The wheel and axle assembly further comprises the wheels 17 press fitted on the axle 18 adjacent its opposite ends but inside the respective journal boxes 14, and the ends of the axle are rotatably mounted in the journal boxes, through anti-friction bearings, as 19.

The parts so far described are conventional truck structure, but it will be understood, that certain features of the invention are equally applicable to other types of truck construction.

The brake mechanism, according to the embodiment of the invention shown, comprises rotary brake members, as 20, one bolted to each wheel 17.

For the support of the non-rotary brake parts and their actuating means, each wheel 17 is provided with an axially inwardly extending bearing seat, as 21, which may be sleeve-like and spaced from the axle. For ease of manufacture and assembly with the associated wheel, the sleeve is formed separately from the wheel and has its flanged outer end nesting with an angular seat on the wheel hub, and both the bearing seat sleeve 21 and the brake member 20 are secured to the wheel by a common annular series of bolts, as 22.

Adjacent the inner end of the bearing seat sleeve 21, is mounted through an anti-friction bearing, as 23, the ring or central hub portion 24 of the brake support, generally indicated by reference numeral, 25. In the assembly, the bearing and ring may be slipped over the reduced inner end of the sleeve 21 and secured in place by a nut, as 26, screwed onto said end. The ring 24 preferably is made in two parts 24a and 24b and has radial inward extensions formed respectively on these parts and arranged on opposite sides of the bearing 23. These extensions are provided with sealing grooves containing suitable oil seals to avoid leaking of oil from the bearing.

All the parts just described are pre-assembled with the bearing sleeve 21, before it is assembled with the wheel, and before the wheel is mounted on the axle.

The brake support, as 25, with this arrangement, may be a very simple generally V-form yoke, having the legs 27 interconnected by a transverse beam 28, having lateral extensions 29 extending beyond the legs and in close adjacency to the peripheries of the respective rotary brake members 20. The spaced ends of the legs 27 are removably secured, through their flattened and widened end portions, by bolts, as 30, to the respective rings 24. At their opposite ends the legs 27 are joined together at 31 and extend between lugs 32 projecting from the transom 12, the parts being secured by a pin 33 passing through end 31 and lugs 32. The end 31 of the yoke fits loosely between the lugs and the pin has a similar loose fit with the opening in the end 31, thereby allowing for the slight relative tilting movement between the parts. With this mounting of the brake support yoke 25, it will be seen that it can be quickly assembled or disassembled by simply releasing the bolts 30 and pin 33, or vice versa.

The laterally projecting ends 29 of the beam 28 serve to directly support the non-rotary brake elements or shoes and their actuating means. The shoes, as 34, cooperating with the opposite faces of the adjacent rotary member 20 to effect the braking are pivotally carried by levers, as 35, pivoted at 36 on the adjacent extension 29 and actuated to braking position by a brake cylinder actuator 37. The support of the shoes and their actuation is similar to that shown in prior Patent No. 2,236,898, issued April 1, 1941, and need not be further described herein.

The bolts 30 and an additional bolt, as 30', may be utilized to secure in place the parts of the two parts 24a and 24b of the bearing ring 24 and an oil deflector ring 38 which deflects any oil escaping from the outer end of the anti-friction bearing 23, away from the braking members 20 and 34. While but two bolts 30, 30' are shown in the drawing, it will be understood that any desired number, considered necessary to securely hold the parts together, may be employed.

While a specific embodiment of the invention has been described, it will be understood that various modifications will occur to those skilled in this art which would still retain the main features of the invention, and it is intended that such modification be covered by the appended claims.

What is claimed is:

1. In combination, a truck frame, a wheel and axle assembly supporting it, at least one wheel of said assembly rotating with the axle and each wheel carrying an axially inwardly extending bearing seat spaced from the axle and a rotary brake member, rings mounted through anti-friction bearings on said seats, and a brake support yoke laterally overlapping said rings and demountably secured to said rings in their overlapping regions and to the truck frame to permit ready removal or replacement of the yoke without disturbing the anti-friction mounting of the rings.

2. In combination, a truck frame, a wheel and axle assembly supporting it, and having laterally spaced bearing seats, a brake support having a main body, hub ring portions mounted through anti-friction bearings to rotate relatively to said laterally spaced bearing seats on the wheel and axle assembly, said brake support laterally overlapping said rings, and readily removable means joining the brake support and ring portions in their overlapping regions to permit ready removal or replacement of the main body of the brake support without disturbing the anti-friction mounting of the ring portions.

CAROLUS L. EKSERGIAN.

REFERENCES CITED

The following references are of record in the file of this patent:

UNITED STATES PATENTS

| Number | Name | Date |
|---|---|---|
| 2,246,214 | McCune et al. | June 17, 1941 |
| 2,174,404 | McCune | Sept. 26, 1939 |
| 2,174,406 | Aikman | Sept. 26, 1939 |
| 2,228,818 | Eksergian | Jan. 14, 1941 |
| 2,174,403 | Farmer | Sept. 26, 1939 |
| 2,174,409 | McCune | Sept. 26, 1939 |
| 2,293,975 | Eksergian | Aug. 25, 1942 |